(12) United States Patent
Fan et al.

(10) Patent No.: US 10,794,835 B2
(45) Date of Patent: Oct. 6, 2020

(54) CO-LOCATION OF AIRBORNE ATMOSPHERIC PARTICULATE SENSING WITH AIRCRAFT LIGHTING

(71) Applicant: Honeywell International Inc., Morris Plains, NJ (US)

(72) Inventors: Xiao Zhu Fan, Plymouth, MN (US); Brett Gordon Northcutt, Royal Oak, MI (US); Stanley Robert Hodge, Sarasota, FL (US)

(73) Assignee: Honeywell International Inc., Morris Plains, NJ (US)

( * ) Notice: Subject to any disclaimer, the term of this patent is extended or adjusted under 35 U.S.C. 154(b) by 417 days.

(21) Appl. No.: 15/903,411

(22) Filed: Feb. 23, 2018

(65) Prior Publication Data

US 2019/0079021 A1    Mar. 14, 2019

Related U.S. Application Data

(60) Provisional application No. 62/557,570, filed on Sep. 12, 2017.

(51) Int. Cl.
  *G01N 21/85* (2006.01)
  *B64D 45/00* (2006.01)
  (Continued)

(52) U.S. Cl.
  CPC .............. *G01N 21/85* (2013.01); *B64D 15/20* (2013.01); *B64D 45/00* (2013.01); *B64D 47/06* (2013.01);
  (Continued)

(58) Field of Classification Search
  CPC ......... G01N 2001/2223; G01N 1/2202; G01N 15/06; G01N 15/0618; G01N 15/0656
  (Continued)

(56) References Cited

U.S. PATENT DOCUMENTS

| | | | | |
|---|---|---|---|---|
| 6,909,376 B2* | 6/2005 | Rennick | ............... | B60Q 1/0023 340/435 |
| 7,535,406 B2* | 5/2009 | Teranishi | ............. | B60Q 1/0023 342/70 |

(Continued)

FOREIGN PATENT DOCUMENTS

EP        3054313 A1    8/2016

OTHER PUBLICATIONS

Airborne Scientific, "CessnaCam Airborne Sensor Pod", Aerial Photography, Remote Sensing, and Flight Support, http://www.airbornescientific.com/content/cessnacam, Retrieved on Nov. 24, 2017, pp. 1-3, Publisher: Airborne Scientific, Inc.

(Continued)

*Primary Examiner* — Clayton E. LaBalle
*Assistant Examiner* — Kevin C Butler
(74) *Attorney, Agent, or Firm* — Fogg & Powers LLC

(57) ABSTRACT

A sensor assembly comprises a device mounted on a surface of a vehicle and extending through at least one passage in the surface of the vehicle, and a sensor comprising a short range particulate (SRP) sensor, or a light detection and ranging (LiDAR) air data sensor. The sensor is co-located and integrated with the device mounted on the surface of the vehicle. No additional passages through the surface of the vehicle are needed to integrate the sensor with the device.

18 Claims, 8 Drawing Sheets

(51) Int. Cl.
*G01S 17/02* (2020.01)
*G01S 7/481* (2006.01)
*B64D 47/06* (2006.01)
*G01S 17/87* (2020.01)
*G01S 17/95* (2006.01)
*B64D 15/20* (2006.01)
*F21W 107/30* (2018.01)
*G01S 7/499* (2006.01)

(52) U.S. Cl.
CPC ............ *G01S 7/4813* (2013.01); *G01S 17/02* (2013.01); *G01S 17/87* (2013.01); *G01S 17/95* (2013.01); *F21W 2107/30* (2018.01); *G01N 2021/8578* (2013.01); *G01N 2201/0214* (2013.01); *G01N 2201/0216* (2013.01); *G01N 2201/06113* (2013.01); *G01S 7/499* (2013.01)

(58) Field of Classification Search
USPC ........................................................ 73/28.01
See application file for complete search history.

(56) References Cited

U.S. PATENT DOCUMENTS

| 2003/0046025 | A1* | 3/2003 | Jamieson | G01C 23/00 |
| | | | | 702/159 |
| 2014/0062756 | A1* | 3/2014 | Lamkin | G08G 5/0021 |
| | | | | 342/29 |
| 2016/0144770 | A1* | 5/2016 | Graf | B60Q 1/0023 |
| | | | | 362/464 |
| 2019/0079021 | A1* | 3/2019 | Fan | G01S 17/02 |

OTHER PUBLICATIONS

European Patent Office, "Extended European Search Report from EP Application No. 18191867.3 dated Jan. 24, 2019", from Foreign Counterpart to U.S. Appl. No. 15/903,411, filed Jan. 24, 2019, pp. 1-8, Published: EP.
Fan et al, "Apparatus and Method for Increasing Dynamic Range of a Particle Sensor", U.S. Appl. No. 15/725,687, filed Oct. 5, 2017, pp. 1-37.

* cited by examiner

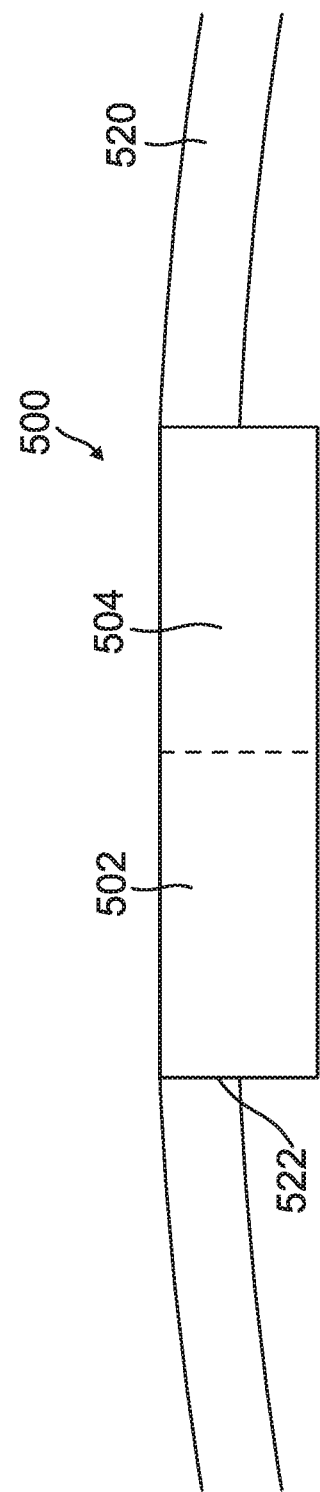

CO-LOCATION OF AIRBORNE ATMOSPHERIC PARTICULATE SENSING WITH AIRCRAFT LIGHTING

This application claims the benefit of priority to U.S. Provisional Application No. 62/557,570, filed on Sep. 12, 2017, the disclosure of which is incorporated by reference.

BACKGROUND

Introducing a new sensor on a commercial aircraft is often challenging, time consuming, and expensive due to the requirement to meet safety margins and certification protocols. Retrofitting a surface mounted sensor which penetrates the fuselage of an aircraft is usually even more challenging, time consuming, and costly due to the need to design and modify the mechanical, electrical, and optical infrastructure needed to support the newly installed sensor. As a result, airlines and aircraft owners are often reluctant to retrofit their aircraft due to the excessive cost and lost revenue, which can out-weigh the benefits of the new sensor.

SUMMARY

A sensor assembly comprises a device mounted on a surface of a vehicle and extending through at least one passage in the surface of the vehicle, and a sensor comprising a short range particulate (SRP) sensor, or a light detection and ranging (LiDAR) air data sensor. The sensor is co-located and integrated with the device mounted on the surface of the vehicle. No additional passages through the surface of the vehicle are needed to integrate the sensor with the device.

BRIEF DESCRIPTION OF THE DRAWINGS

Embodiments can be more easily understood and further advantages and uses thereof will be more readily apparent, when considered in view of the detailed description and the following figures, in which:

FIG. 8 illustrates a co-located flush mounted device/SRP of one exemplary embodiment.

In accordance with common practice, the various described features are not drawn to scale but are drawn to emphasize specific features relevant to the subject matter described. Like reference characters denote like elements throughout the figures and text.

DETAILED DESCRIPTION

Figure 1:
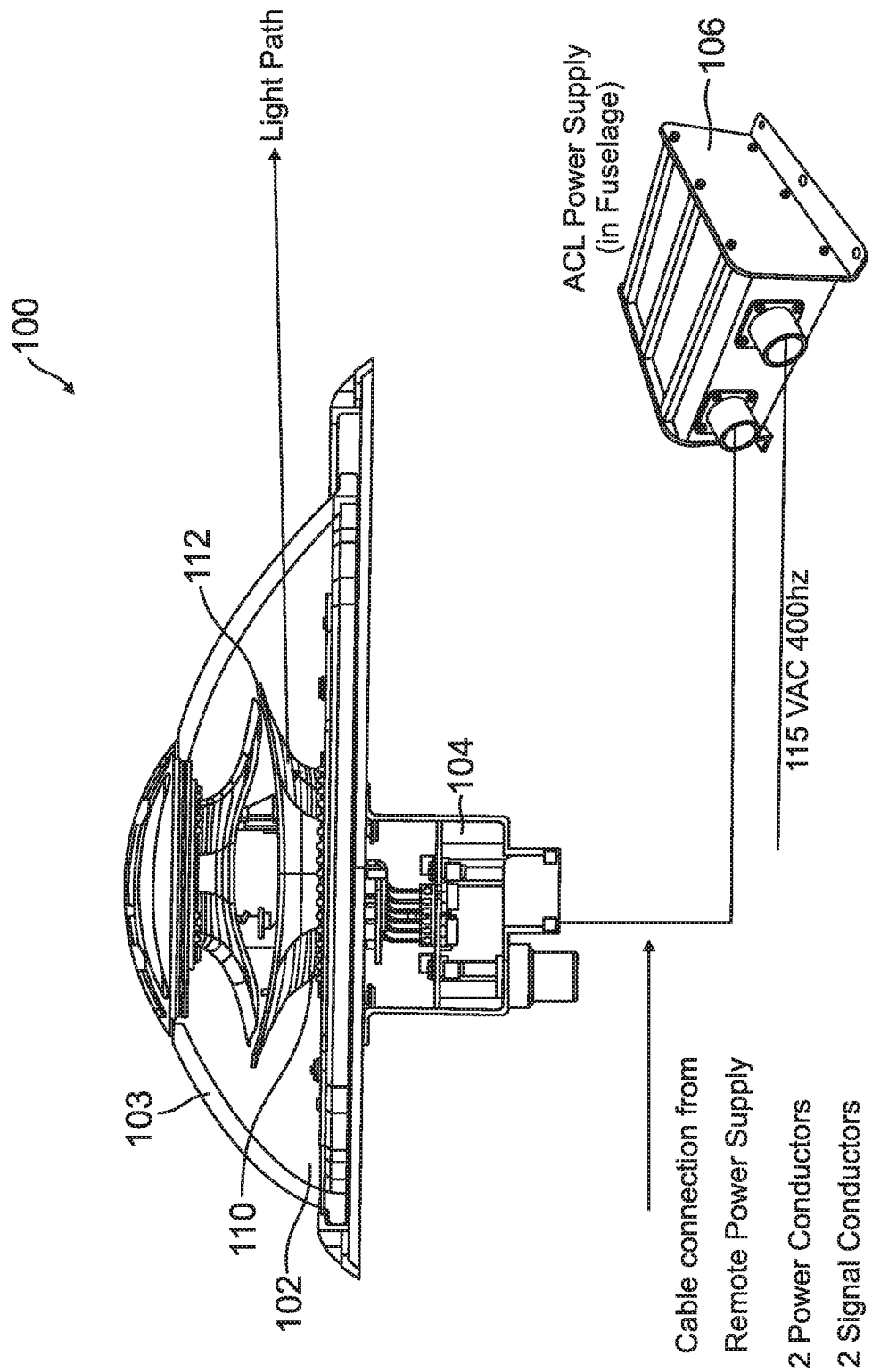
FIG. 1 is a side view of a Fuselage Aircraft Anti-Collision Light (FACL) of the prior art.

In the following detailed description, reference is made to the accompanying drawings, which form a part hereof, and in which is shown by way of illustration specific embodiments in which the invention may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

The present invention provides an approach for the co-location of sensors, such as airborne atmospheric particulate sensing devices, with devices mounted on a surface of a vehicle such as aircraft lighting assemblies. In one embodiment, a Short Range Particulate (SRP) sensor is co-located with a device used with a vehicle, such as an aircraft lighting device. The SRP sensor is integrated with the device such that no additional passages through a surface of the vehicle need to be created in implementing the SRP sensor. In another embodiment, a light detection and ranging (LiDAR) air data sensor is co-located and integrated with the device mounted on the surface of the vehicle.

A conventional hardware install on the aircraft skin typically requires a cutout for each instrument installed. Some embodiments provide an SRP sensor that is designed to be located on an exterior of an aircraft without having to cut a hole through an airframe and needing to re-certify the airframe. In some embodiments, the SRP sensor is packaged with another already present device. These embodiments take advantage of an existing cutout and co-locate a hybrid/integrated system that would enable the functionality of two or more different devices. Moreover, some embodiments reuse existing structure and wiring already in place on the aircraft.

Further, some embodiments provide the co-locating of two or more sensors and Line Replaceable Units (LRUs) in the same cutout to take advantage of all the existing infrastructure in place already, such as, but not limited to, frame doublers, structural mounts, and potentially cabling, power supply, windows, etc. Other devices for co-locating the SRP sensor may include, but are not limited to, a Fuselage Aircraft Anti-collision Light (FACL) assembly, an antenna, a WiFi communication assembly, other data sensing devices, etc. Various embodiments provide lower installation cost for each aircraft, lower certification costs, shorter install time, and shorter aircraft down time.

As discussed above, technical benefits of co-locating embodiments with one or more sensors in an existing surface-mounted LRU provide for efficient installation and maintenance, reducing the requirement for additional power and data cable wirings, allowing information cross-pollination (i.e., count number of particles seen to monitor the window condition of the lighting system). Other advantages of various embodiments include system SWAP-C (size, weight, power, cost) optimization, reduced weight which results in fuel savings, lower cost, usable on more diverse set of platforms, minimizing customer revenue-generating down-time, and minimizing Supplemental Type Certificates (STC) certification costs.

In one embodiment, a SRP sensor is co-located with a FACL to form a FACL/SRP assembly. The Federal Avionics Register (FAR) Part 25, Section 1401 sets out the minimum intensities in any vertical plane of anti-collision lights. Each anti-collision light intensity must be equal to or exceed applicable values as set out in Section 25.1401. Three hundred and sixty degree directional coverage is required and the lights must be flashed at a rate of 1.4 seconds with an on time of approximately 250 ms. An example of a conventional FACL 100 is illustrated in FIG. 1. The FACL 100 has three main parts, including an optical head 102, electronic components 104, and a power supply 106. The optical head 102 is positioned outside of the fuselage (not shown) of the aircraft and includes the lights (circle of LEDs 110 in this example) and a circular refractor 112, which are positioned within a transparent dome head 103. The electronic components 104 are, in this example, positioned within the fuselage and the power supply 106, such as an ACL power supply, is also positioned within the fuselage.

Figure 2:
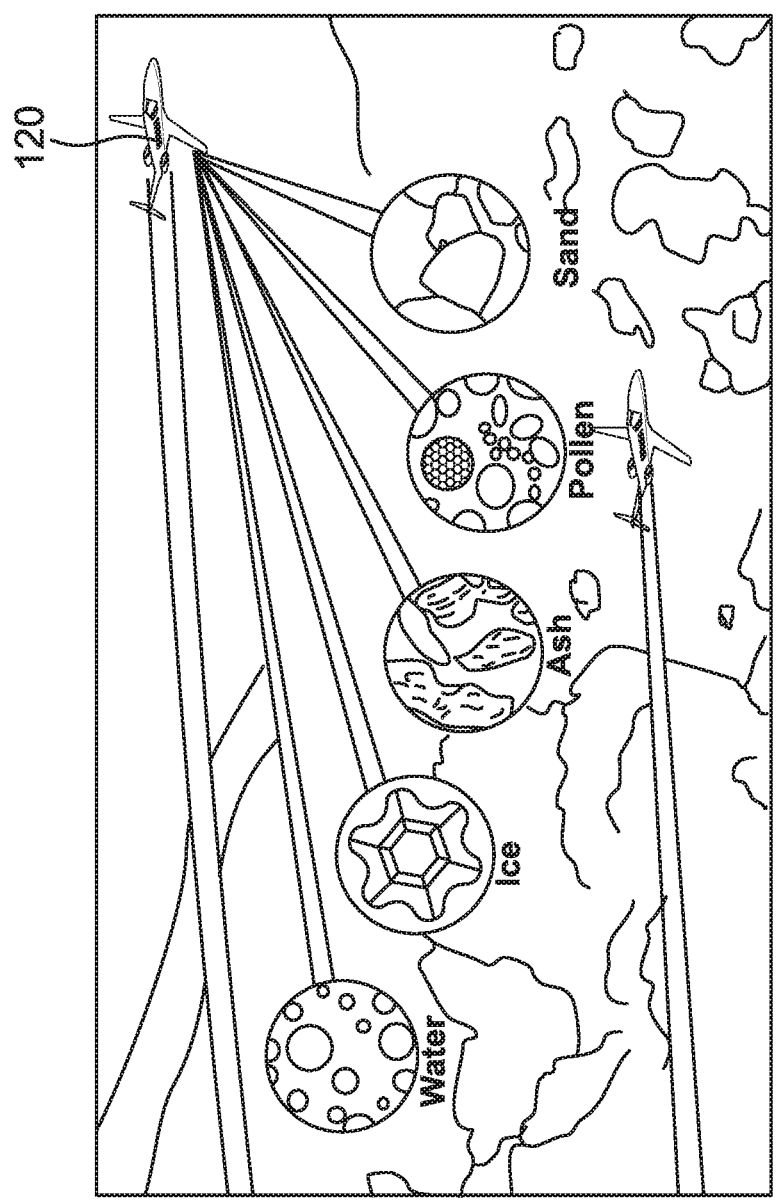
FIG. 2 is an illustration of example particulates in the atmosphere an aircraft may encounter.

An SRP sensor is a system the counts the particles in the atmosphere, measuring the particle size and also giving information about the nature of the particle. Examples of particulates that may be detected by an SRP sensor of an aircraft 120 are shown in FIG. 2. For example, the particles may include, but are not limited to, water, ice, ash, pollen, and sand. Having information regarding particulates in the atmosphere may be used to improve aircraft safety, as well as providing information on atmospheric conditions. For example, volcanic ash and sand may cause damage if ingested by an aircraft's engines. Hence, if volcanic ash or sand is detected in the atmosphere, a pilot can use that information to reroute the aircraft. Sensing the particles in the atmosphere also improves prognostics and subsequent operational uptime through better tracking of sand and dust environments through which the aircraft is flown. Moreover, the SRP sensor can provide weather information where radar is not present or supplement radar that is present.

Figure 4:
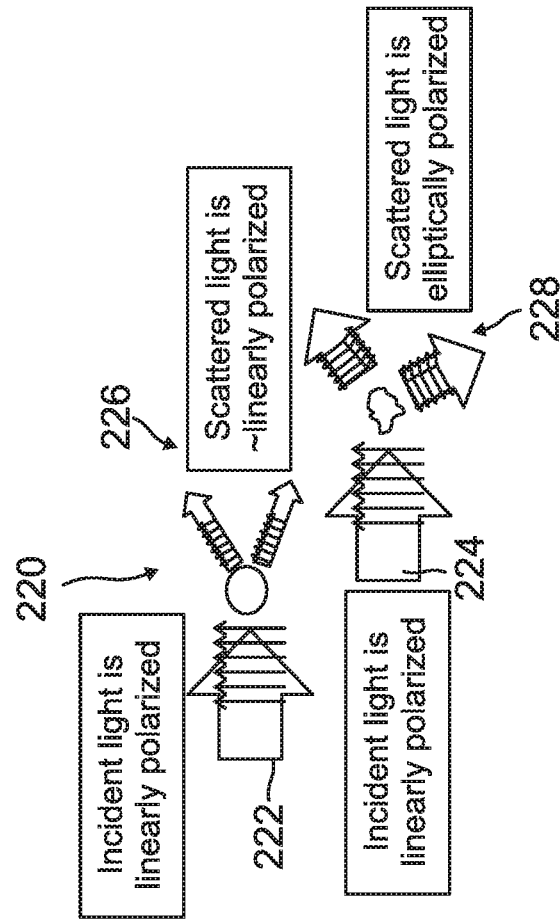
FIG. 4 is an illustration of the workings of an SRP sensor.
Figure 3:
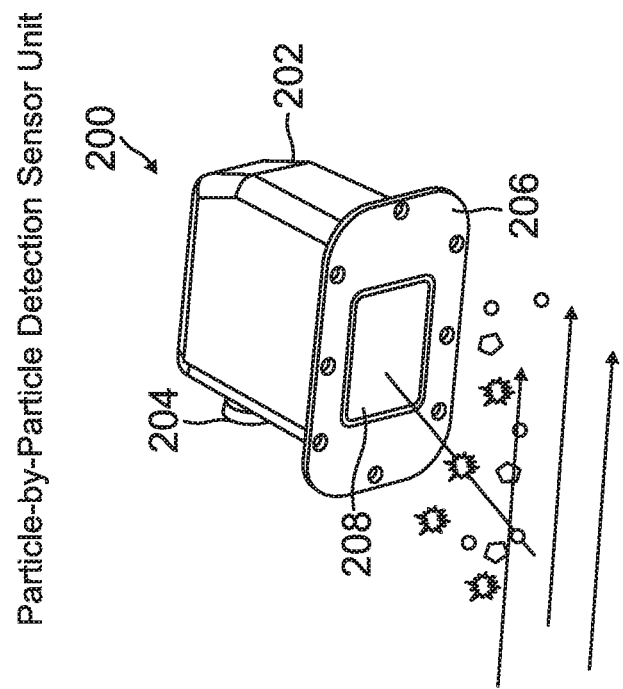
FIG. 3 is a side perspective view of a Short Range Particulate (SRP) sensor.

Referring to FIG. 3, an example SRP senor 200 is illustrated. As illustrated the SRP sensor 200 includes a housing 202 with an input/output (I/O) port 204. The housing 202 also includes a mounting plate 206 and a window 208. With an SRP sensor, an optical transceiver remotely measures particle size and shape. The diagram 220 of FIG. 4 illustrates portions of the operation of the SRP sensor 200. A linearly polarized laser beam is used as the incident interrogation light as illustrated by 222 and 224. Polarized optical backscatter illustrated as 226 and 228 is collected and analyzed to determine the size and shape of each particle. A neural network is used to identify particle type based on particle characteristics and distributions. In general a SRP sensor 200 may include electronics, at least one laser, lenses, an optical focusing assembly, a beam splitter, temperature stabilization and photo diodes.

Figure 5:
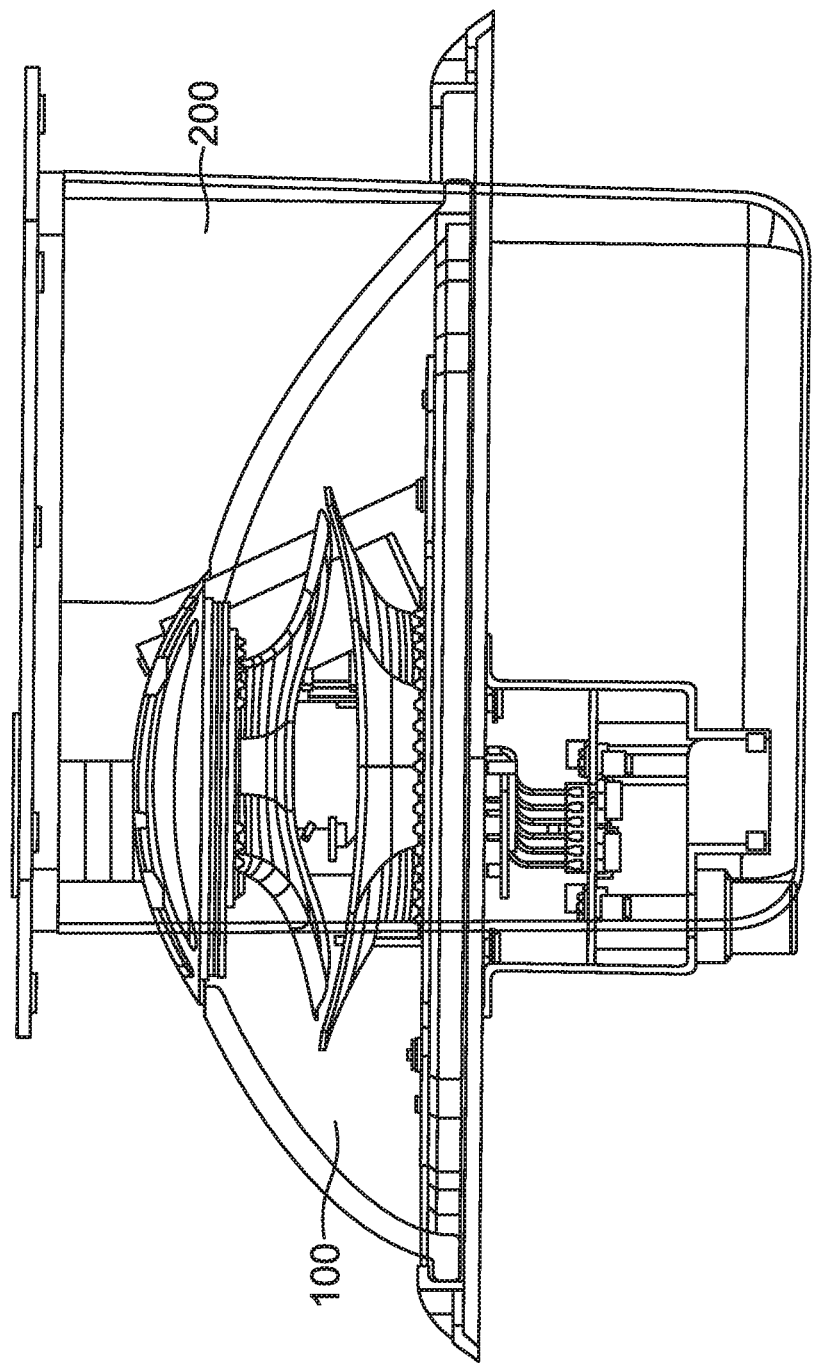
FIG. 5 is a side view of the SRP sensor imposed on the FACL of FIG. 1, illustrating the challenges of co-locating these devices.

A problem in co-locating the SRP sensor 200 with the FACL 100 is illustrated in FIG. 5. In particular, initial packaging problems include that there is no space for the electronics. Moreover, the SRP sensor 200 requires too much of the area and sticks out into the airstream. This would create added drag that would hamper the performance of the aircraft.

Figure 6A:
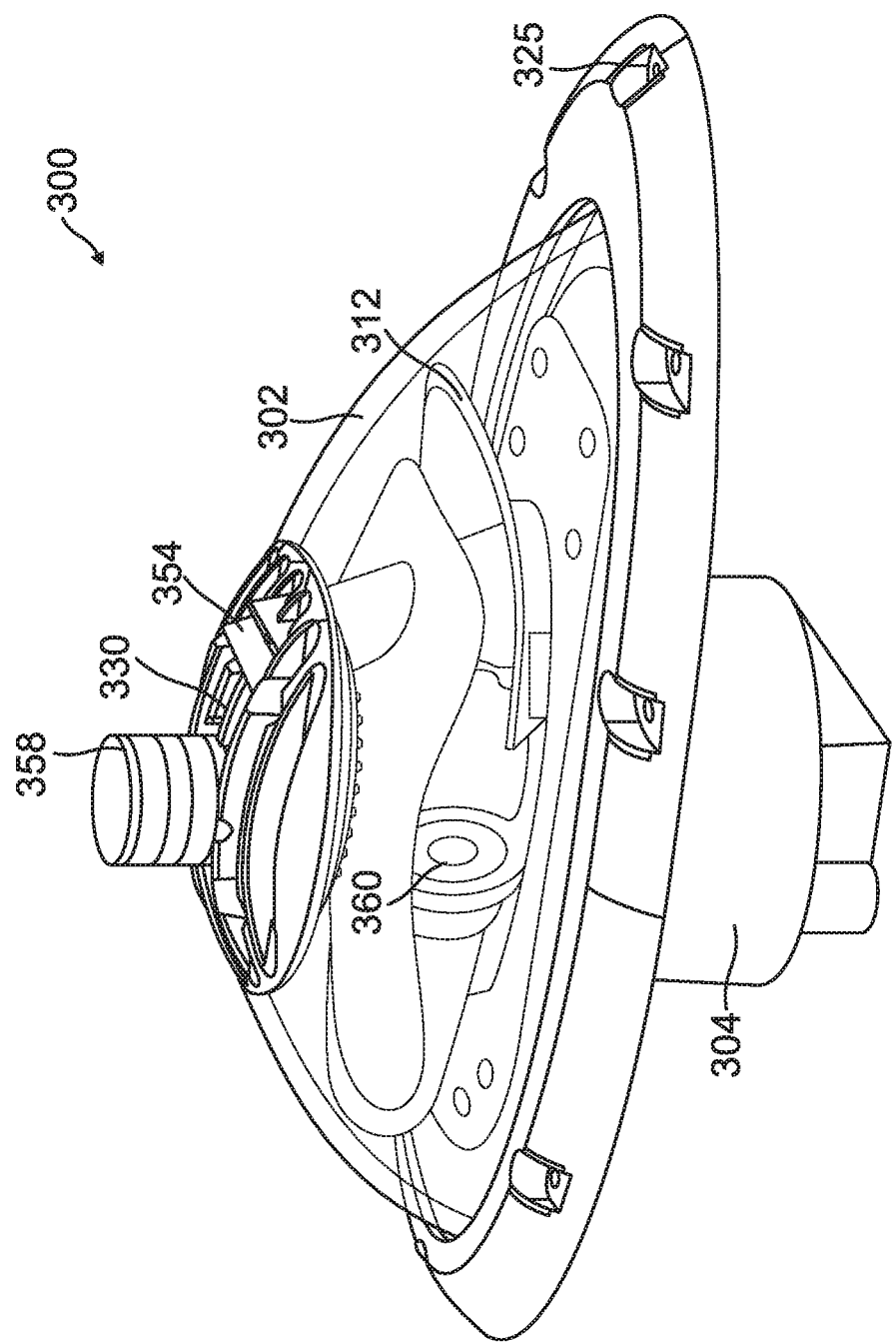
FIG. 6A is a side perspective view of a co-located FACL/SRP assembly, according to one exemplary embodiment.
Figure 6B:
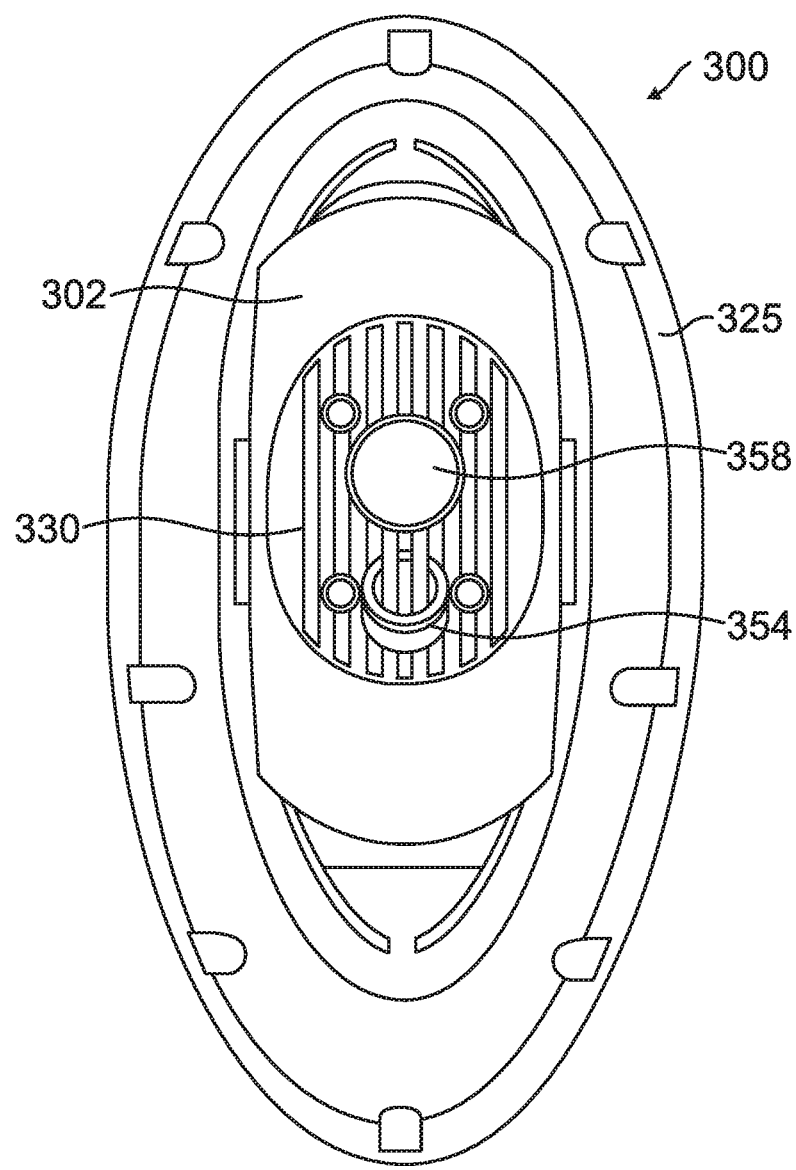
FIG. 6B is a top view of the co-located FACL/SRP assembly of FIG. 6A.

An exemplary embodiment that solves the packaging problem is illustrated in FIGS. 6A and 6B. As illustrated in FIGS. 6A and 6B, a co-located FACL/SRP assembly 300 includes an optical head 302 of the FACL which includes a plurality of LEDs and a circular refractor 312 housed within a transparent dome head. A base 325 is configured to be coupled to a fuselage (not shown). Extending through the dome head is a laser 354 of the SRP sensor portion. An optical focusing assembly 358 including receive optical lenses of the SRP sensor portion is further positioned proximate an outer surface of the dome head. Moreover, an optional beam splitter 360 of the SRP sensor portion can be positioned within the optical head 302 within an inner diameter formed by the circular refractor 312 of the optical head 302 of the FACL portion.

Further, the electronics of the SRP sensor portion may be positioned within a hollowed out plate within an electronic housing 304 of the FACL portion or may be placed in a remote location such as a power supply, for example, the power supply 106 illustrated in FIG. 1. The FACL design of the FACL/SRP assembly 300 is split in half and separated to provide room for the sensors and laser of the SRP sensor portion. Optimization of optic focusing packaging reduces the overall height issue. In an embodiment, a plate 330 coupled to the dome head may encompass and secure the optical focusing assembly 358 and the top of the laser 354 of the SRP sensor portion. In one embodiment the plate 330 is made out of metal. In one embodiment, two SRP sensor arrays of an SRP sensor portion are reduced to one array (with a possible second array being positioned in an upper fuselage). Moreover, in one embodiment, the FACL power supply is redesigned to supply straight power to the combined light head (optical head 302), with other wires providing timing for the flash (e.g., switching for the flash moved to the light head). This allows the straight power to also be used for the SRP components of the SRP sensor portion within the optical head 302. In another embodiment, the power supply to a light head cable is changed to accommodate easier partitioning between SRP and FACL functions.

In an embodiment, a remote power supply box is replaced. Further, in an embodiment, an input harness to the power supply box remains the same. In one embodiment illustrated in a first block diagram 400 of FIG. 7A, the power supply 106 is provided to the optical head 302. In this embodiment, the wire harness from the power supply 106 to the optical head 302 remains unchanged. For example, 2× 12 gauge power wires (28 VDC) and 2× 20 gauge strobe light signal wires may be used. The power wires are shared between the SRP and FACL components. However, signal wires are not shared. The electronics and requirements that may be in the optical head 302 include 150 VDC, +VDC, analog to digital converters, heater controller, laser controller, strobe light controller, Avalanche Photodetector Thermal Electric Controllers (APD TECs), memory, 802.11g, and radio.

Figure 7B:
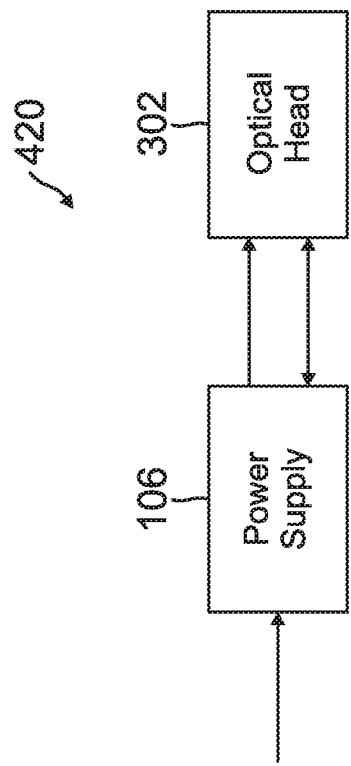
FIG. 7B is a block diagram of an interaction between the power supply and optical head of a FACL/SRP assembly of another exemplary embodiment.
Figure 7A:
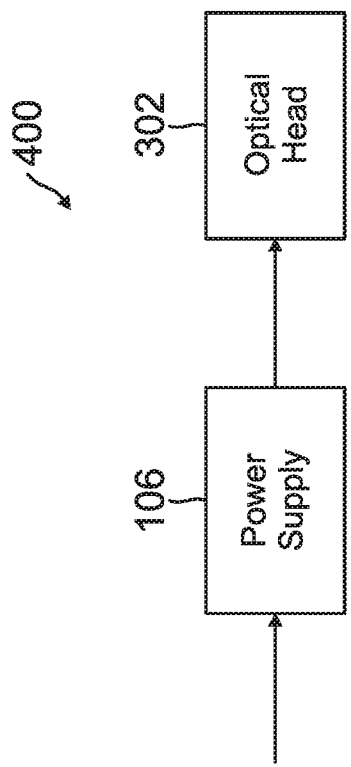
FIG. 7A is a block diagram of an interaction between the power supply and optical head of a FACL/SRP assembly of one exemplary embodiment.

A second block diagram 420 of FIG. 7B illustrates another embodiment. In this embodiment, additional wire harness from the power supply 106 to the optical head 302 is provided. In an embodiment, less than 20 wires are used with low current. In this embodiment the wiring is independent of the lighting power supply and cable harness. Most of the electronics of the SRP sensor portion reside in the power supply in this example embodiment. Moreover, an analog to digital converter and radio reside in the optical head 302.

In some embodiments, information sensed by the SRP sensor portion is provided independent of component of the FACL portion. In one embodiment, an output of the SRP sensor portion is provided by a wireless communication system. The transmitter of this system maybe located within the electronic housing 304, the dome head 303, a power supply such as the power supply 106 of FIG. 1, or in any other location within the aircraft. In another embodiment, information collected by the SRP sensor portion is retained in a memory. In one embodiment, the information in the memory is downloaded once the aircraft is landed.

As discussed above, an SRP sensor in various embodiments can be co-located with a multitude of different types of devices that are already installed (or are going to be installed) that may have a portion that extends through a fuselage of an aircraft. This is generally illustrated in FIG. 8, where a co-located device/SRP 500 includes an SRP portion 502 and a device portion 504, with at least a portion of the co-located device/SRP 500 extending through a passage 522 of a fuselage 520. The device portion 504 in this example is part of a flush mounted device.

An example of a flush mounted device 504 that may be co-located with an SRP sensor is a flush mounted LiDAR air data system. A flush mounted LiDAR air data system is also known as an optical air data system or short range air data system. A flush mounted LiDAR air data system is an airborne optical system, including one or more lasers, one or more photodetectors, passive optics, and electronics, which remotely measures air data parameters (e.g., true air speed and direction, angle of attack, angle of side slip, true air temperature, true air pressure). The LiDAR air data system is flush mounted to the fuselage of the vehicle by cutting a hole in the fuselage. The SRP sensor can take advantage of the LiDAR air data system's cut-out, support infrastructure (i.e., power supply, data cable, cable feedthroughs, optical port, mechanical mount, etc.), and data output (i.e., air data) by co-locating (and integrating) the two optical systems.

The co-located device may also benefit from the output parameters of the SRP sensor. Hence, in one exemplary embodiment, output data of the SRP sensor is shared with the co-located device. In yet another exemplary embodiment, input and output data from the co-located device maybe shared with the SRP sensor. This example may be applicable when the device is a smart device (i.e. sensor) wherein its system parameters (i.e., inputs or outputs) may be of use to the SRP sensor.

EXAMPLE EMBODIMENTS

Example 1 includes a sensor assembly, comprising: a device mounted on a surface of a vehicle and extending through at least one passage in the surface of the vehicle; and a sensor comprising a short range particulate (SRP) sensor, or a light detection and ranging (LiDAR) air data sensor, the sensor co-located and integrated with the device mounted on the surface of the vehicle; wherein no additional passages through the surface of the vehicle are needed to integrate the sensor with the device.

Example 2 includes the sensor assembly of Example 1, wherein the sensor is operatively coupled to a power supply of the device.

Example 3 includes the sensor assembly of any of Examples 1-2, further comprising: a wireless communication transmitter configured to transmit sensed SRP sensor information.

Example 4 includes the sensor assembly of any of Examples 1-3, further comprising: a memory configured to store sensed SRP sensor data or LiDAR air data sensor data.

Example 5 includes the sensor assembly of any of Examples 1-4, wherein the vehicle is an aircraft.

Example 6 includes the sensor assembly of any of Examples 1-5, wherein the device is a fuselage aircraft anti-collision light (FACL).

Example 7 includes the sensor assembly of any of Examples 1-6, further comprising: a laser in an SRP sensor portion of the SRP sensor; and receive optical lenses in the SRP sensor portion.

Example 8 includes the sensor assembly of any of Examples 6-7, wherein at least some electronics of an SRP sensor portion of the SRP sensor is integrated with at least one of an electronic housing and a power supply of a FACL portion of the FACL.

Example 9 includes the sensor assembly of any of Examples 6-8, wherein separate power supply wiring is provided to at least some SRP sensor components of an SRP sensor portion of the SRP sensor, and components of a FACL portion of the FACL.

Example 10 includes the sensor assembly of any of Examples 1-9, wherein the device is a LiDAR air data system, and the sensor is an SRP sensor.

Example 11 includes the sensor assembly of any of Examples 1-10, wherein a data output of the sensor is shared with the device.

Example 12 includes the sensor assembly of any of Examples 1-11, wherein at least one of a data input and output of the device is shared with the sensor.

Example 13 includes the sensor assembly of any of Examples 1-12, wherein the device is flush mounted on the surface of the vehicle.

Example 14 includes a sensor assembly, comprising: an aircraft lighting device mounted on a surface of an aircraft and extending through at least one passage in the surface of the aircraft; and a sensor comprising a short range particulate (SRP) sensor, or a light detection and ranging (LiDAR) air data sensor, the sensor co-located and integrated with the aircraft lighting device mounted on the surface of the aircraft; wherein no additional passages through the surface of the aircraft are needed to integrate the sensor with the aircraft lighting device.

Example 15 includes the sensor assembly of Example 14, wherein the aircraft lighting device is a fuselage aircraft anti-collision light (FACL).

Example 16 includes the sensor assembly of any of Examples 14-15, further comprising: a laser in an SRP sensor portion of the SRP sensor; and receive optical lenses in the SRP sensor portion.

Example 17 includes the sensor assembly of any of Examples 15-16, wherein at least some electronics of an SRP sensor portion of the SRP sensor is integrated with at least one of an electronic housing and a power supply of a FACL portion of the FACL.

Example 18 includes the sensor assembly of any of Examples 15-17, wherein separate power supply wiring is provided to at least some SRP sensor components of an SRP sensor portion of the SRP sensor, and components of a FACL portion of the FACL.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:
1. A sensor assembly, comprising:
a device mounted on a surface of a vehicle and extending through at least one passage in the surface of the vehicle; and an atmospheric sensor comprising an optical short range particulate (SRP) sensor operative to measure atmospheric particulates encountered by the vehicle, or a light detection and ranging (LiDAR) air data sensor operative to remotely measure air data parameters, the atmospheric sensor co-located and integrated with the device mounted on the surface of the vehicle;

wherein no additional passages through the surface of the vehicle are needed to integrate the atmospheric sensor with the device.

2. The sensor assembly of claim 1, wherein the atmospheric sensor is operatively coupled to a power supply of the device.

3. The sensor assembly of claim 1, further comprising: a wireless communication transmitter configured to transmit sensed SRP sensor information.

4. The sensor assembly of claim 1, further comprising: a memory configured to store sensed SRP sensor data or LiDAR air data sensor data.

5. The sensor assembly of claim 1, wherein the vehicle is an aircraft.

6. The sensor assembly of claim 1, wherein the device is a fuselage aircraft anti-collision light (FACL).

7. The sensor assembly of claim 1, further comprising: a laser in an SRP sensor portion of the SRP sensor; and receive optical lenses in the SRP sensor portion.

8. The sensor assembly of claim 6, wherein at least some electronics of an SRP sensor portion of the SRP sensor is integrated with at least one of an electronic housing and a power supply of a FACL portion of the FACL.

9. The sensor assembly of claim 6, wherein separate power supply wiring is provided to at least some SRP sensor components of an SRP sensor portion of the SRP sensor, and components of a FACL portion of the FACL.

10. The sensor assembly of claim 1, wherein the device is a LiDAR air data system, and the atmospheric sensor is the optical SRP sensor.

11. The sensor assembly of claim 1, wherein a data output of the atmospheric sensor is shared with the device.

12. The sensor assembly of claim 1, wherein at least one of a data input and output of the device is shared with the atmospheric sensor.

13. The sensor assembly of claim 1, wherein the device is flush mounted on the surface of the vehicle.

14. A sensor assembly, comprising:
an aircraft lighting device mounted on a surface of an aircraft and extending through at least one passage in the surface of the aircraft; and
an atmospheric sensor comprising an optical short range particulate (SRP) sensor operative to measure atmospheric particulates encountered by the aircraft, or a light detection and ranging (LiDAR) air data sensor operative to remotely measure air data parameters, the atmospheric sensor co-located and integrated with the aircraft lighting device mounted on the surface of the aircraft;
wherein no additional passages through the surface of the aircraft are needed to integrate the atmospheric sensor with the aircraft lighting device.

15. The sensor assembly of claim 14, wherein the aircraft lighting device is a fuselage aircraft anti-collision light (FACL).

16. The sensor assembly of claim 15, wherein at least some electronics of an SRP sensor portion of the SRP sensor is integrated with at least one of an electronic housing and a power supply of a FACL portion of the FACL.

17. The sensor assembly of claim 15, wherein separate power supply wiring is provided to at least some SRP sensor components of an SRP sensor portion of the SRP sensor, and components of a FACL portion of the FACL.

18. The sensor assembly of claim 14, further comprising:
a laser in an SRP sensor portion of the SRP sensor; and
receive optical lenses in the SRP sensor portion.

* * * * *